March 23, 1971   A. E. BEAUMONT   3,572,180

METHOD FOR FORGING CUTTING WHEELS

Filed Aug. 28, 1968

INVENTOR:
ALFRED E. BEAUMONT
BY
Elliott & Pastoriza
ATTORNEYS 3,572,180
METHOD FOR FORGING CUTTING WHEELS
Alfred E. Beaumont, 5510 Melvin Ave.,
Tarzana, Calif. 91356
Filed Aug. 28, 1968, Ser. No. 756,054
Int. Cl. B21k 21/00
U.S. Cl. 76—101                                    1 Claim

ABSTRACT OF THE DISCLOSURE

A cutter wheel is shaped by positioning a billet within a pair of mated dies and striking the billet with a punch. An intermediate zone of the billet is locally preheated so that upon impact from the punch, the intermediate zone material will bulge into a die cavity defined by die peripheries formed on the dies. As the intermediate zone billet material is forced into the die cavity, the metal grain lines are reoriented in radial directions so as to strengthen the edge to be ultimately used as a cutting edge.

---

This invention relates to apparatus and a method for forging circular edged cutting devices and more specifically cutter wheels capable of being mounted within various tools and machines intended to sever pipes and rods.

BACKGROUND OF THE INVENTION

A customary technique for fabricating cutting wheels necessitates numerous time consuming operations. Ordinarily metallic bar stock is severed into segments and, after cut-away zones have been outlined, substantial material is carved out or removed by machining which material becomes wasted. Machining techniques for removing the excess material are often complex and dangerous and when machining accuracy deteriorates the billet or cutter wheel often must be rejected.

This conventional technique results in a cutter wheel whose cutting edge, after it has been ground down to the desired sharpness, cannot absorb relatively high cutting stresses because the metal grain is misoriented for optimum cutting conditions. As the cutter wheel edge becomes more sharpened the edge becomes increasingly weaker and thus more prone to failure.

BRIEF SUMMARY OF THE INVENTION

The present invention comprehends apparatus and a method for quickly forging high strength, durable cutting wheels for cutting pipes and rods and the like. The apparatus operates to forge a metal billet having a relatively hot intermediae zone and cold ends into a cutter wheel having a cutter body portion that substantially corresponds with the billet hot intermediate zone and mounting lugs that correspond with the billet cold ends. A pair of separable dies have adjacent concave die peripheries which coact to define a die cavity. When the billet intermediate zone has been heated, one end is placed into a recess formed in one die while the other billet end projects outwardly from the other die.

A punch holder is arranged for movement toward and from the die from which the billet end projects. A punch is coupled to the punch holder for striking the projecting billet end when the punch holder is thrust sufficiently toward the dies. Impact upon the projecting billet portion forces the material of the hot intermediate zone to flow laterally and fully occupy the die cavity. The die cavity constitutes the desired shape of the cutter wheel's cutter body portion which becomes formed as the billet ends are transformed into mounting lugs.

Preferably a bore formed in one of the dies is sized to receive the punch which in turn serves to penetrate increasingly deeper into the bore to press the billet intermediate zone into the die cavity. Preferably one of the dies and the punch holder are interconnected by biasing means such as a plurality of springs that operate to urge the die and holder away from one another when a billet is not being forged.

The method of forging the billet into a cutter wheel comprehends first heating only the intermediate zone of the billet to a suitable forging temperature cooler than the temperature of the billet ends. The billet is positioned partially within the die cavity and then the projecting billet end is struck in order to compress the billet intermediate zone. This results in forcing the intermediate zone to flow laterally outwardly into the die cavity while simultaneously developing radially extending grain flow lines. The grain flow lines serve to greatly strengthen the cutting edge. The flowing material is shaped into the cutter body portion as the billet cold ends are shaped into the mounting lugs.

BRIEF DESCRIPTION OF THE DRAWINGS

The numerous benefits and unique aspects of the present invention will be fully understood when the following detailed description is studied in conjunction with the drawings in which.

DETAILED DESCRIPTION OF THE PREFERRED EMBODIMENT

Figure 1:
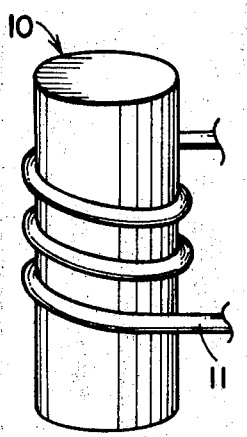
FIG. 1 is a perspective view showing a billet being heated at an intermediate zone.

Referring now to FIG. 1 a cylindrically shaped billet 10 is shown that has been severed from a length of metallic bar stock suitable for forging. Wrapped around an intermediate zone of billet 10 is an induction heating coil 11 which may be energized to heat a localized section of billet 10.

Figure 2:
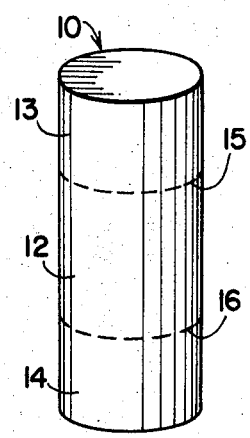
FIG. 2 is a perspective view showing that after the heating action has terminated the billet has relatively cool ends and a heated intermediate zone.

FIG. 2 illustrates the condition of billet 10 after its intermediate zone 12 has been heated to a suitable forging temperature. The billet ends 13 and 14 are preferably kept at ambient temperature and may be cooled by a cooling medium as intermediate zone 12 is heated. Dotted lines 15 and 16 indicate the separation or transitional zones between relatively hot intermediate zone 12 and relatively cold ends 13 and 14, respectively.

Figure 3:
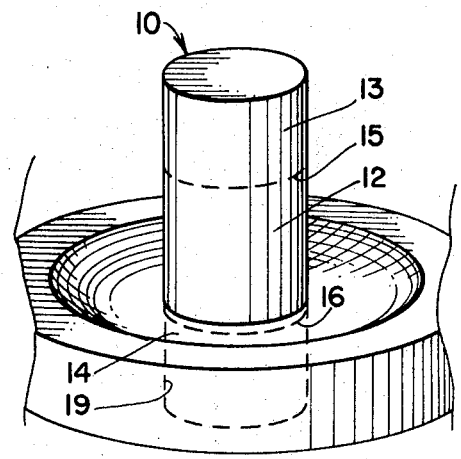
FIG. 3 is a perspective view showing the billet oriented within a recess formed in a lower die.

FIG. 3 shows billet 10 arranged in a die 17 formed with a concave die periphery 18 and a recess 19 extending centrally through die periphery 18. Billet end 14 is dimensioned to fit into recess 19 with a slight clearance. The length of billet 10 may, for example, be two to four times greater than the billet diameter.

Figure 4:
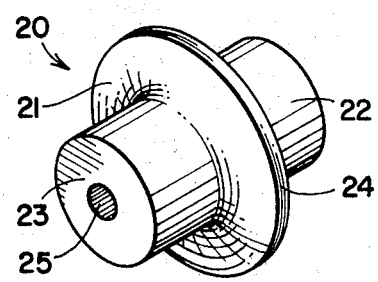
FIG. 4 is a perspective view of a cutter wheel capable of being made in accordance with the present invention.

FIG. 4 shows a cutter wheel 20 that results from forging the billet. Cutter wheel 20 includes a cutter body portion 21 forged from the billet intermediate zone and mounting lugs 22 and 23 forged from the billet ends. Since the cutter wheel blank that directly results from the forging action will be relatively rough and dull it is ground or otherwise sharpened by any conventional technique to accomplish a sharpened cutting edge 24. Also after the cutting wheel blank is perfectly forged a retaining aperture 25 is fabricated centrally through cutter wheel 20 enabling it to be easily assembled in a cutting tool or machine.

Figure 5:
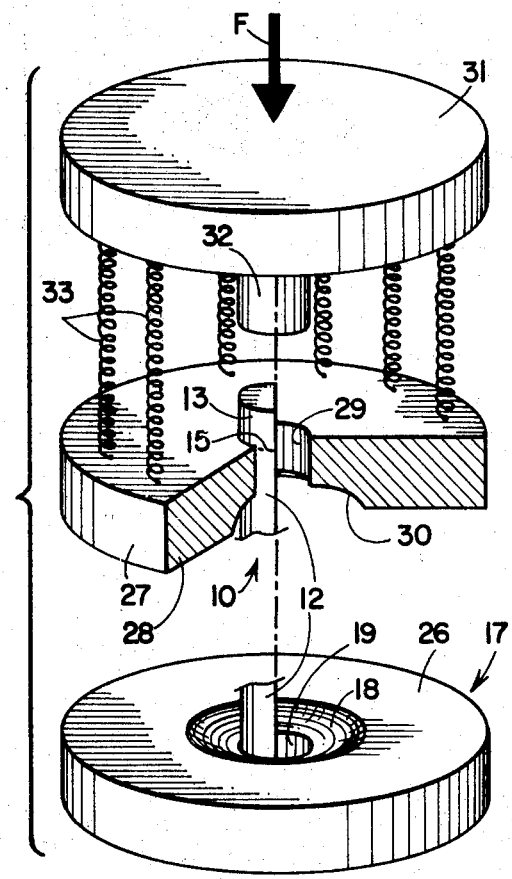
FIG. 5 is an exploded, partially fragmentary view showing the billet arranged within two separable dies before the billet is forged.

Referring now to FIG. 5 die 17, which constitutes a lower stationary die, has an upper surface 26. An upper die 27 has a lower surface 28 that lies in flush engagement with lower die surface 26 when billet 10 is being forged. Upper die 27 may be easily separated from die 17 and raised so that a completed forged cutter wheel blank can be removed from the die apparatus and further treated.

Upper die 27 is formed with a centrally extending bore 29 whose lower end intersects with a concave die periphery 30. As shall be explained, concave die peripheries 18 and 30 are similarly shaped and combined to constitute a die cavity.

Oriented above upper die 27 is a punch holder 31 that mounts a punch 32 which is sized to fit within bore 29. During forging action, punch holder 31 is thrust downwardly with a force F enabling punch 32 to strike billet end 13 which projects above die 27. Punch holder 31 and upper die 27 are interconnected by a biasing means in the form of a plurality of springs 33. The combined biasing force of the springs is sufficient to ordinarily urge punch 32 out of contact with billet end 13.

Figure 6:
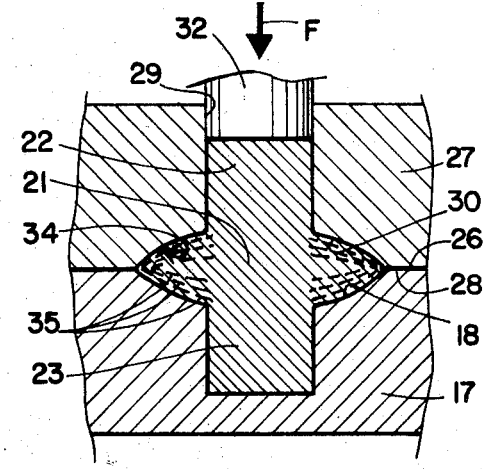
FIG. 6 is a vertical sectional view through the dies and die cavity after forging, showing the shape of a forged cutter wheel.

FIG. 6 shows punch 32 penetrated into bore 29 at a time immediately after the billet has been forged into a cutting wheel blank. When dies 17 and 27 are pressed together their respective die peripheries 18 and 30 mate so as to define a die cavity 34. Die cavity 34 imparts the desired contouring and shape to the cutter body portion 21 of the cutter wheel blank. During forging action the grain flow lines of the billet become upset and reoriented in laterally extending directions until radially extending grain flow lines 35 are generated. Grain flow lines 35 serve to greatly reinforce and strengthen the circumferential section of the cutter wheel blank that is to subsequently be sharpened for cutting purposes. When the cutter wheel edge is sharpened as shown in FIG. 4 it will be capable of withstanding stresses vastly greater than those stresses which cutter wheels fabricated by conventional techniques can bear.

OPERATION

Keeping the above construction and method in mind it can be understood how many of the previously described disadvantages of prior art cutter wheel fabricating techniques are overcome or substantially eliminated by the present invention.

Initially a billet 10 is locally heated at only an intermediate zone 12 to a suitable forging temperature while the billet ends 13 and 14 are maintained at a temperature substantially lower than the forging temperature. Billet 10 is then positioned upright in recess 19 of lower die 17. Upper die 27 is then dropped from a raised position until it becomes aligned in flush relationship with lower die 17. Billet 10 is dimensioned so that its upper cold end 13 will project upwardly from die 27 and its intermediate zone 12 will be partially confined by die cavity 34.

Upon completion of these preparatory steps, punch holder 31 is thrust downwardly enabling punch 32 to strike billet cold end 13 and thereby compress billet intermediate zone 12. Intermediate zone 12 will bulge and flow laterally outwardly into the die cavity during which time the billet grain flow lines will become reoriented into radially extending grain flow lines. When the forging action is completed, the billet intermediate zone 12 will have been forged into cutter body portion 21 and the billet cold ends 13 and 14 will have been shaped into cutter wheel mounting lugs 22 and 23.

After the cutter wheel blank has been forged and sufficiently cooled die 27 is raised so that the cutter wheel blank may be removed from the die apparatus. Then the circumference of cutter body portion 21 is sharpened to form a cutting edge 24 and a retaining aperture 25 is drilled through cutter wheel 20. Since cutter wheel 20 is forged there is virtually no excess or wasted material, and, since the grain lines are oriented as previously mentioned the cutter wheel will last longer and endure greater stresses than conventional cutting wheels.

From the foregoing it will be evident that the present invention has provided an apparatus and a method for forging cutter wheels in which all of the various advantages are fully realized.

What is claimed is:

1. A method of forging a metal billet into a cutter wheel having mounting lugs on opposing sides of a cutter body portion, the method comprising the steps of:
   (a) heating only an intermediate zone of the billet to a suitable forging temperature cooler than the temperature of the billet ends;
   (b) positioning the billet partially within a die cavity defined by concave die peripheries of two separable dies;
   (c) orienting the billet generally vertically and arranging the billet end to be struck so that it projects upwardly and extends out of the dies before it is struck;
   (d) striking the upper billet cold end in order to compress the billet intermediate zone;
   (e) retaining the billet intermediate zone entirely within the dies before and during the striking action;
   (f) forcing the intermediate zone to flow laterally outwardly into the die cavity while developing radially extending grain flow lines in the flowing material;
   (g) shaping the flowing material into a cutter body portion as the billet cold ends are shaped into mounting lugs; and,
   (h) withdrawing the resulting forged cutter wheel from the die cavity and sharpening the circumference of the cutter body portion.

References Cited

UNITED STATES PATENTS

| 1,268,365 | 6/1918 | La Vercombe | 76—101A |
| 1,668,442 | 5/1928 | Wineman | 72—364 |
| 2,581,774 | 1/1952 | Stone et al. | 72—364 |
| 2,743,509 | 5/1956 | Friedman | 72—364 |
| 2,953,794 | 9/1960 | Klooz | 72—364 |
| 3,196,534 | 7/1965 | Ditson | 72—364 |

RICHARD J. HERBST, Primary Examiner

U.S. Cl. X.R.

72—364